United States Patent [19]

Slevin

[11] Patent Number: 4,605,464

[45] Date of Patent: Aug. 12, 1986

[54] METHOD AND MACHINE FOR PRODUCING COMPLANCE CARRIER CARTONS

[76] Inventor: Julian B. Slevin, 221 Moylan Ave., Moylan, Pa. 19065

[21] Appl. No.: 497,916

[22] Filed: May 25, 1983

[51] Int. Cl.[4] ........................ B32B 31/08; B32B 31/18

[52] U.S. Cl. .................................... 156/253; 156/260; 156/264; 156/494; 156/512; 206/193; 493/90; 493/334

[58] Field of Search ............... 156/253, 254, 260, 264, 156/494, 512, 521; 493/90, 91, 92, 334; 206/192, 193, 196, 200, 187

[56] References Cited

U.S. PATENT DOCUMENTS 1,452,379 4/1923 Haren .................................. 156/512
1,776,353 9/1930 Dunbar et al. ...................... 156/264
1,794,674 3/1931 Cimfer .................................. 156/260
3,236,414 2/1966 Slevin .................................. 206/187
3,429,235 2/1969 Aekley .................................. 493/334
3,566,752 3/1971 Dreher .................................. 156/264
3,744,383 7/1973 Finch et al. .......................... 156/264
4,362,240 12/1982 Elward ................................ 206/193

*Primary Examiner*—Caleb Weston
*Attorney, Agent, or Firm*—B. J. Powell

[57] ABSTRACT

Apparatus for making cell forming inserts for bottle carriers using a continuous web of paperboard. Drive rolls pull the web under tension through a slitter mechanism to slit strips from opposite edges of the web. The slit strips are shifted laterally inwardly over the web by guides and glued back on the web so that, when the web is transversely severed to form the inserts and attached to the bottle carrier blank, the strips will lie between the bottle contact points at the center cell.

6 Claims, 10 Drawing Figures

METHOD AND MACHINE FOR PRODUCING COMPLANCE CARRIER CARTONS

BACKGROUND OF THE INVENTION

This invention relates generally to the manufacture of basket type bottle carriers and more particularly to such bottle carrier manufacture with the center cells formed by separate inserts.

Basket type bottle carriers made from paperboard, cardboard or like sheet material with the center cells in the carrier formed by partition inserts are well known in the art. An example of this type bottle carrier is illustrated in my earlier U.S. Pat. No. 3,236,414. In this type bottle carrier, the main paperboard blank and the inserts typically have a common thickness. While this thickness is typically sufficient for most types of transportation, some types of transportation such as rail transportation require a greater thickness of material between the bottles in the carrier than this common thickness. All of the material thicknesses between the bottles typically meet this requirement except the opposite sides of the center cells of the carton. One solution to this compliance problem is to glue an additional strip of material along the insert on opposite sides of the center cell along the points of contact between the bottles. The fabrication of this improved carrier has proved difficult in that the movement of both of the strips with that of the inserts and carrier blanks must be synchronized in order to produce an adequate carrier.

SUMMARY OF THE INVENTION

These and other problems and disadvantages of the prior art are overcome by the invention disclosed herein by providing an improved compliance carrier using a single web of material to form both the insert and the compliance strips attached thereto. This eliminates most of the problems of controlling the various components associated with the prior art.

The method of the invention includes slitting the compliance strips from opposite edges of a continuous web blank, relocating the strips transversely of the web so that the strips are properly located for the insert, and reattaching the strips to the web. The strips are continuous as they slit and reattach to the web so that the proper tensions therein can be easily maintained. The distance between the point of slitting to the point of reattachment is the same for both the web and the strips so that the strips are reattached to the web at the same lengthwise position as when the strips are slit.

The insert forming apparatus of the invention includes drive means for pulling the web blank through the apparatus with tensioning means for maintaining tension in the web blank. Slitter means is provided for slitting the compliance strips from opposite sides of the web blank with web guide means to guide the web and strip guide means to guide the strips along separate paths. The strip guide means shift the strips laterally of the web so that they are positioned inboard of the web edges. Attachment means adhesively reattach the strips to the web so that each strip extends lengthwise of the web and inboard of the web from which it was removed.

These and other features and advantages of the invention disclosed herein will become more apparent upon consideration of the following specification and accompanying drawings wherein like characters of reference designate corresponding parts throughout the several views and in which:

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Figure 1:
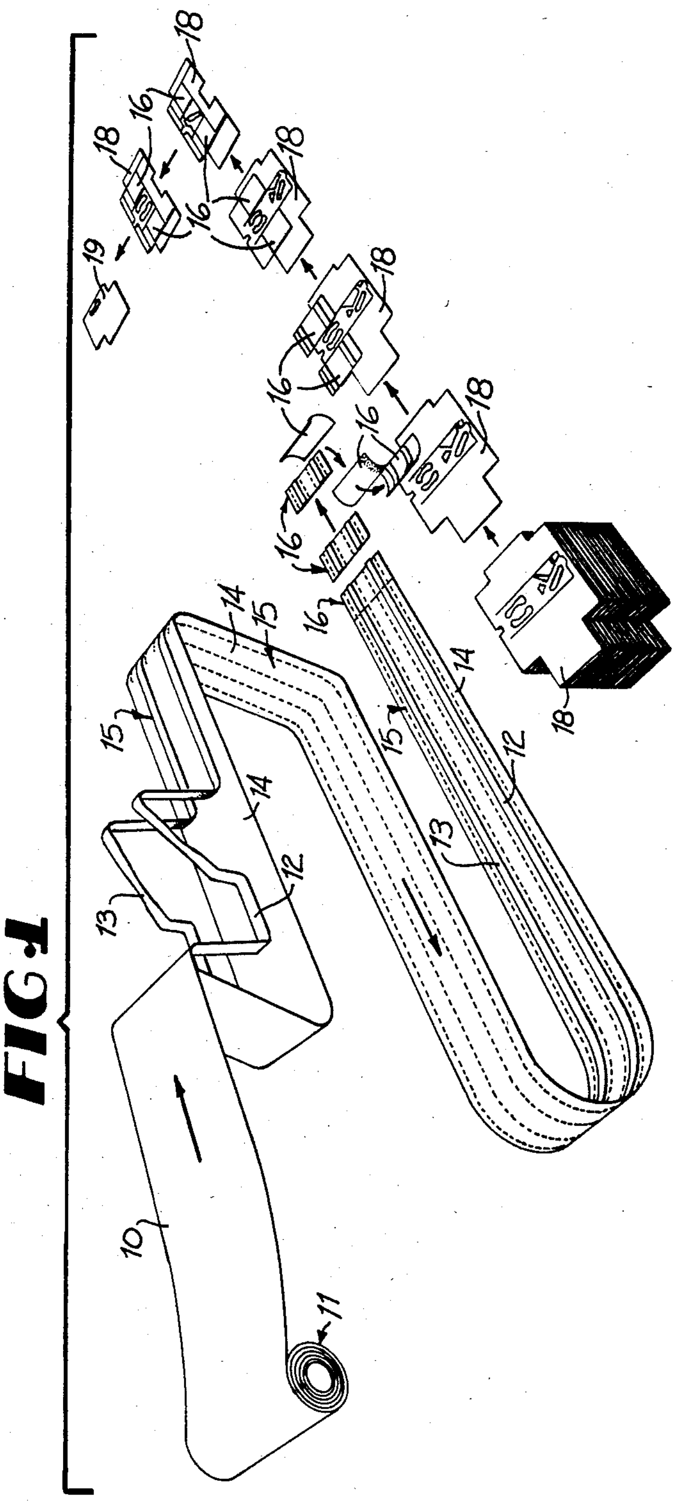
FIG. 1 is a free body diagram illustrating the fabrication of a bottle carrier incorporating the invention.

The overall fabrication process incorporating the invention is schematically illustrated in FIG. 1. A continuous web blank 10 of paperboard is unrolled from a roll 11 and pulled along a processing path past a slitting position where continuous narrow strips 12 and 13 are slit from opposite side edges of web blank 10 leaving a central web 14 whose transverse width corresponds to the length of the insert blanks to be made. The strips 12 and central web 14 are separated to move along upper and lower paths respectively. While the strips 12 and 13 move along the upper paths, they are laterally displaced inwardly toward each other so that the lateral spacing therebetween is less than the width of the central web 14. The strips 12 and 13 and web 14 are then moved back together at a gluing position so that the strips 12 and 13 are juxtaposed onto the web 14 at positions inboard of the opposite edges of web 14 and adhesively reattached to form a laminated web assembly 15. The positions of the strips 12 and 13 on the web 14 is such that the strips 12 and 13 will be located at the point of contact of the bottles in the carrier when fabrication is complete. The distance that the strips 12 and 13 travel between the point where the strips are separated. from the web and the point where the strips are reattached to the web is selected to be equal to the distance the central web 14 travels between these points so that the strips 12 and 13 are lengthwise located on the web 14 after reattachment the same as before the web 10 is slit.

As the web 14 with the strips 12 and 13 reattached thereto continue to move along the processing path, the web 14 is longitudinally perforated at a perforating position to form the perforated fold lines which will be needed in the completed insert. The thusly perforated web 14 with the strips 12 and 13 thereon is then continuously discharged into an accumulating position where the web assembly 15 is ready to be processed into the inserts.

The laminated web assembly 15 is intermittently fed away from the accummulating position through a cutting position where the web 14 and strips 12 and 13 are cut transversely to form the insert 16 but leaving the insert 16 still attached to the leading end of the web assembly 15 by small connecting strips. This keeps the insert 16 moving with the web assembly 15 past a separating position where the insert 16 is pulled from the web assembly 15 by breaking the connecting strips and moved past a gluing position where glue is applied to one end of the insert 16.

The insert 16 is then moved into proper registration with a carrier blank 18 moving along a carrier processing path and the glued end attached to the carrier blank. It will be appreciated that two inserts 16 are attached to each carrier blank. The carrier blank 18 with the two insets 16 attached at one end is moved past another gluing position where glue is applied to the opposite ends of the inserts 16 and then past a folding position where the inserts 16 are folded back over themselves to attach the opposite ends of the inserts 16 to the carrier blank 18. The carrier blank 18 is then moved through various gluing and folding steps to complete the fabrication of the carrier 19 in its collapsed condition.

Figure 2:
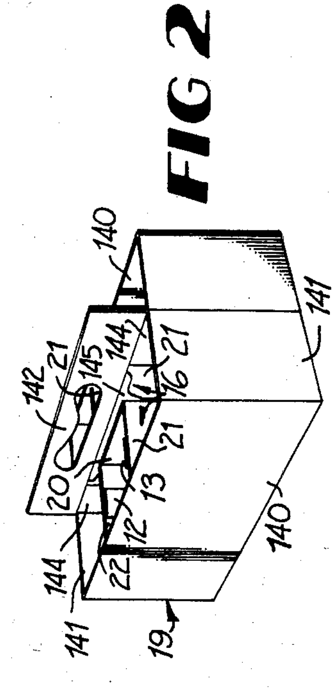
FIG. 2 is a perspective illustrating the bottle carrier in a set-up condition.

As is well known, the carrier 19 is set up and filled in appropriate equipment. Such a set up carrier 19 is illustrated in FIG. 2 where each of the inserts 16 form the center cell in each row of cells in the carrier. The strips 12 and 13 are located on the insert 16 so that they lie along those portions of insert 16 between the points of contact of the bottle in the center cell with the bottles in the end cells.

Figure 3:
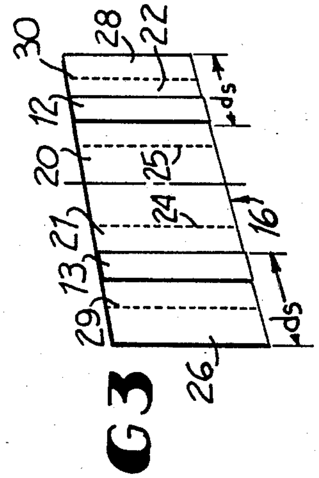
FIG. 3 is a perspective view illustrating an insert incorporating the invention.
Figure 4:
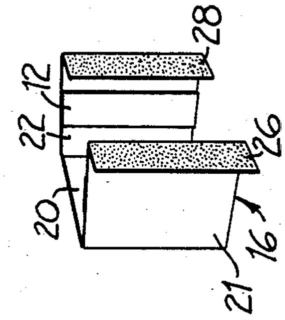
FIG. 4 is a perspective view of the insert in a set-up condition.

The relative positions of the strips 12 on the insert 16 are best illustrated in FIGS. 3 and 4. As seen in FIG. 3, the insert 16 has a medial panel 20 foldably joined to side panels 21 and 22 along opposite side edges thereof at the perforated fold lines 24 and 25. A pair of glue flaps 26 and 28 are foldably joined to the side panels 21 and 22 respectively along fold lines 29 and 30. The longitudinal axis $A_L$ of the medial panel 20 corresponds to the centerline of the central web 14 before it is cut. The strips 12 and 13 are respectively attached to the side panels 21 and 22 so that they are centered across the width thereof and extend along the height thereof.

The flaps 26 and 28 are secured to the carrier side wall so that, when the carrier is set up as seen in FIG. 2, the insert 16 is set up into the position seen in FIG. 4. The insert 16 thus forms the center cell in each row of cells in the carrier with side panel 21 separating the center cell from one of the end cells while the other side panel 22 separates the center cell from the other end cell. Since most bottles transported in the carrier have a generally circular cross-sectional shape, the closest points between the adjacent bottles lie along a line centered across the width of the side panel and extending along the height thereof. Thus, by locating the strips 12 and 13 on the side panels 21 and 22 so that they are centered across their widths and extend along their heights, a double thickness of material is provided at the points of contact between the bottles in the center and end cells to comply with transport regulations. Thus, the amount of paperboard required to comply with the regulations is minimized. Typically, the strips 21 and 22 have transverse width of about one-half to one inch to insure adequate coverage.

Figure 6:
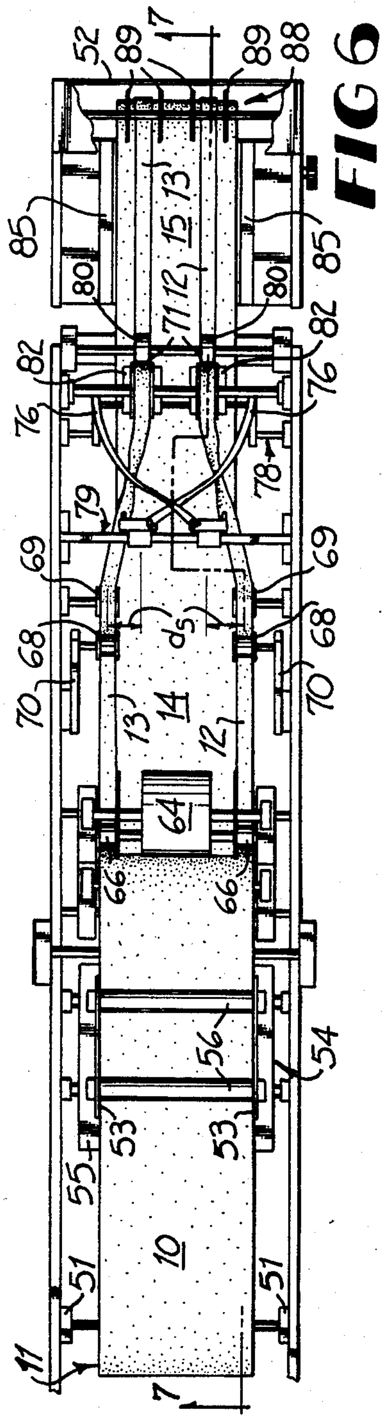
FIG. 6 is a top view of the apparatus of FIG. 5.
Figure 5:
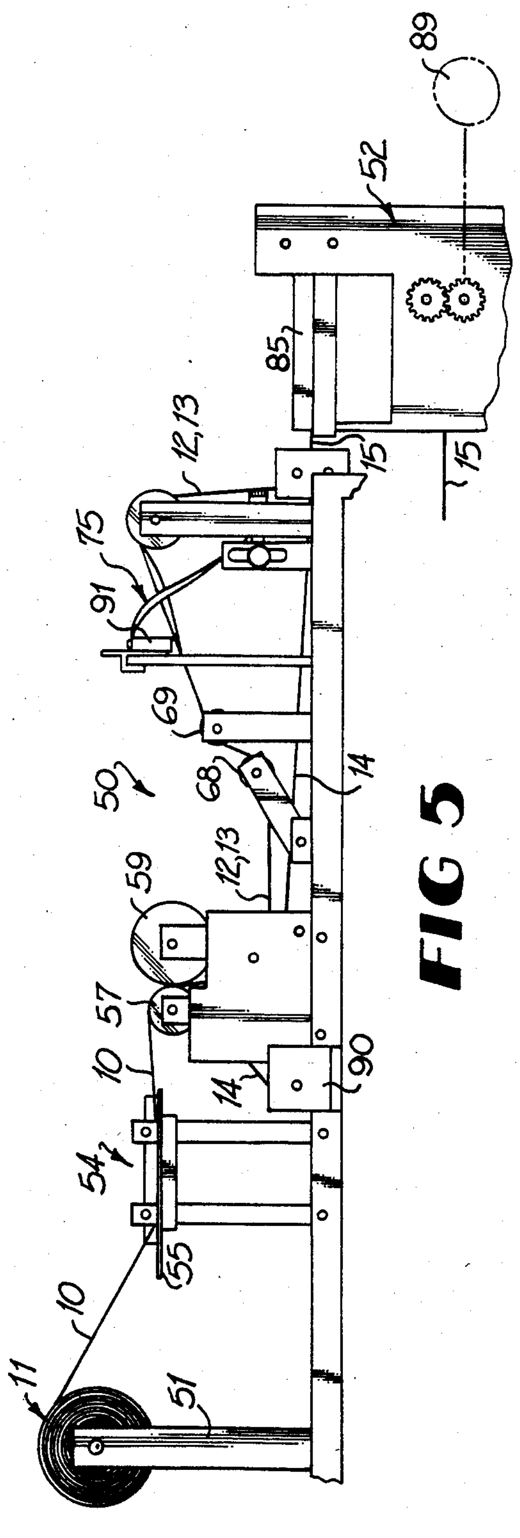
FIG. 5 is a side view of the apparatus used in the fabrication of the invention.
Figure 7:
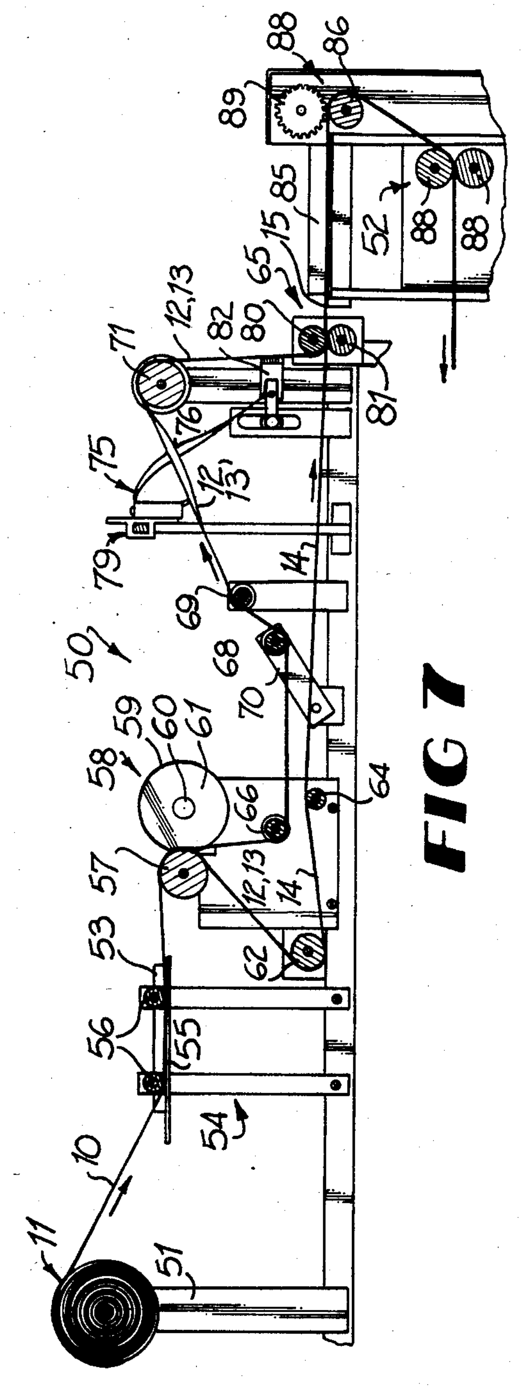
FIG. 7 is a cross-sectional view taken generally along line 7—7 in FIG. 6.

The strip laminating apparatus 50 for producing the web assembly 15 from the initial web blank 10 is best seen in FIGS. 5–7. A roll stand 51 mounts the roll 11 of paperboard at one end of apparatus 50 while a drive assembly 52 at the opposite end of the apparatus pulls the paperboard from the roll 11 through the apparatus.

The web blank 10 unrolled from roll 11 passes through a tensioning device 54 to keep a prescribed tension in the paperboard as it moves through the laminating apparatus. The device 54 includes a slide plate 55 against which the web blank 10 is pressed by pressure rolls 56 adjusted so that it takes a prescribed amount of force to pull the web blank 50 therethrough. This keeps the paperboard taut as it is pulled through the apparatus by the drive assembly 52. Side guides 53 in the tensioning device 54 maintain the lateral tracking of the web blank 10.

The web blank 10 then passes over a backup roll 57 in a slitter mechanism 58. A pair of spaced apart slitter knives 59 are mounted on a drive shaft 60 mounted for rotation about an axis normal to the longitudinal centerline of the web blank 10. A short drive roll 61 mounted on shaft 60 between knives 59 rides on the web 10 at backup roll 57 so that movement of web 10 drives the shaft 60 to rotate the slitter knives 59. The cutting edges on knives 59 engage the web blank 10 and slit it along its opposite edges to separate the strips 12 and 13 from the central web 14.

The web 14 passes from the backup roll 57 down and back under web blank 10 to a shifting roll 62. Web 14 passes around roll 62 so that it is rotated as web 14 is pulled thereover and then over a support roll 64 as it moves forwardly out from under the slitter mechanism 58. This spaces the web 14 well below the slitter mechanism 58 as it moves generally horizontally to the laminating mechanism 65.

The strips 12 and 13 each pass down from the backup roll 57 under a flanged roller 66 rotatably mounted under the slitter mechanism 58 but above the plane of the web 14 so that each strip 12 and 13 is separated from web 14. Each strip 12 and 13 then passes generally horizontally to a flanged takeup roller 68, under roller 68 and then upwardly and over a flanged locating roller 69. Each takeup roller 68 is rotatably mounted on a pivot arm 70 so that roller 68 can move up and down as arm 70 pivots. The weight of arm 70 and roller 68 keeps each strip 12 and 13 taut between rollers 66 and 69. It will be appreciated that all of the rollers 66, 68 and 69 are freely rotatable about axes normal to the centerline of the web 14. Those rollers 66, 68 and 69 carrying the strip 12 lie generally in the same vertical plane along one side of web 14 while those rollers 66, 68 and 69 carrying the strip 13 lie generally in the same vertical plane along the opposite side of web 14. Thus, while strips 12 and 13 are vertically displaced with respect to web 14, they still have the same relative lateral position with respect to the web 14 before they were severed.

Each strip 12 and 13 passes upwardly as seen in FIGS. 5 and 7 and inwardly over web 14 as seen in FIG. 6 from roller 69 to a flanged upper positioning roller 71. Both of the rollers 71 are mounted on a common shaft 72 for rotation about an axis transversely of web 14. As best seen in FIG. 6, each roller 71 is laterally shifted inboard of its cooperating roller 69 the distance $d_S$.

Deflection assemblies 75 are provided for shifting the strips 12 and 13 inboard as they pass from rollers 79 to 71. Each deflection assembly 75 includes a strip deflector 76 that engages strip 12 or 13 to push it inwardly.

The lower end of the strip deflector 76 is carried by an appropriate mount 78 while its upper end mounted in a transversely adjustable mount 79 so that the strip deflector 76 can be laterally shifted as required to deflect the strip 12 or 13 sufficiently to keep it on the rollers 69 and 71.

Each strip 12 and 13 passes downwardly and under an unflanged pressure roller 80 in the laminating mechanism 65. The web 14 is passing over a backup roll 81 in mechanism 65 and under roller 80 so that the pressure roller 80 forces the strip 12 or 13 down against web 14. As each strip 12 and 13 passes down from roller 71 to roller 80, a glue applicator 82 applies an adhesive to that side of the strip 12 or 13 which will lie against web 14. The applicators 82 are adjustably mounted on the mount 78. Thus, when the rollers 80 press the strips 12 and 13 down against the web 14, the adhesive bonds them together to form the laminated web assembly 15. Typically, the adhesive is of the quick setting type such as hot melt glue.

The web assembly 15 then passes between a pair of upstanding guide plates 85 to laterally align the web assembly 15 for perforating. The web assembly then passes over a backup roll 86 in the perforator 88 and under the perforating wheels 89. This causes the cutting edges on the wheels 89 to longitudinally perforate the web 14 in assembly 15 for the fold lines in the insert 16 made from assembly 15.

The web assembly 15 then passes down and between the drive rolls 88 in the drive assembly 52. The drive rolls 88 are appropriately driven by a drive unit 89 schematically shown in FIG. 5 so that the forces pulling both web 14 and strips 12 and 13 through the apparatus is provided by the drive rolls 88. This eliminates the necessity of having to match separate drives for the strips and web.

The length of the path along which the central web 14 travels between the point where it is slit from web blank 10 in slitter mechanism 58 to the point where it is laminated to the strips 12 and 13 in the laminating mechanism 65 and the length of the path along which each of the strips 12 and 13 travels between slitter mechanism 58 and laminating mechanism 65 are selected to be equal so that the strips 12 and 13 are laminated onto the web 14 at substantially the same lengthwise position they had in the web blank 10. This facilitates setup and processing and assures utilization of the complete roll 11.

A motion detector 90 is connected to the shifting roll 62 to detect when the web 14 and thus strips 12 and 13 are moving through the apparatus. Detector 90 causes the glue applicators 82 to discharge the adhesive onto the strips 12 and 13. Breakage detectors 91 are carried on the mount 79 and serve to detect a breakage of strip 12 or 13 and stop the apparatus if such breakage occurs.

Figure 8:
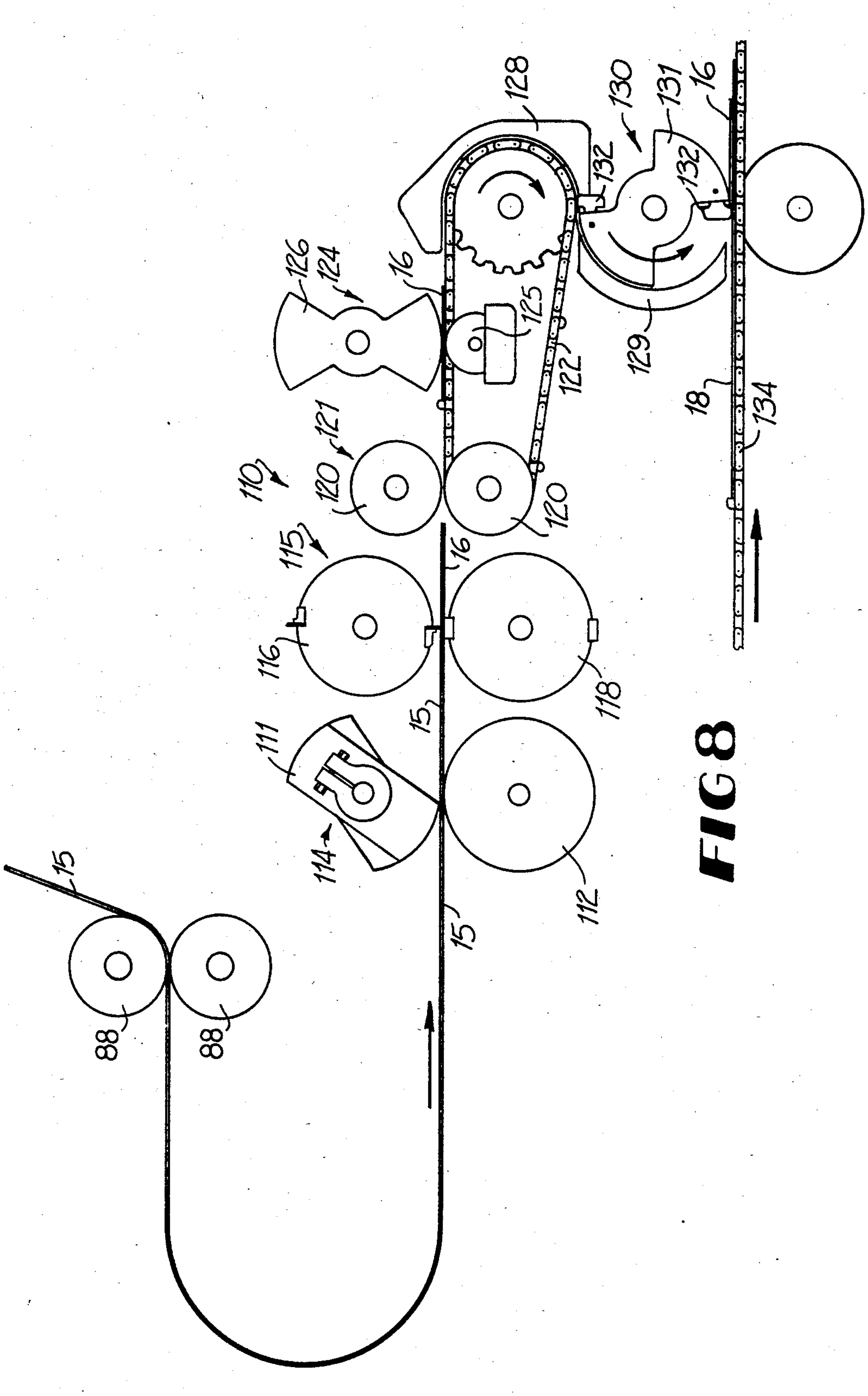
FIG. 8 is a schematic view illustrating the apparatus for completing the insert and attaching same to a carrier blank.

The perforated web assembly 15 is continuously discharged from rolls 88 into the accumulating position in an insert fabricating and attachment drive. The specific details of a device of this type are disclosed in U.S. Pat. No. 3,429,235 and incorporated herein by reference. To relate such a device to the laminating apparatus 50, it is schematically illustrated in FIG. 8 and designated generally 110. The device 110 is designed to intermittently feed the web assembly 15 away from the accumulating position to form the inserts 16 and attach the inserts 16 to the carrier blank 18.

The web assembly 15 is looped in the accumulating position and fed therefrom by rotating cam sectors 111 cooperating with a backup roll 112 in an intermittent feed mechanism 114. Each time the sectors 111 grip the web assembly 15 between them and roll 112, the web assembly 15 is driven into the devive for a prescribed distance. The relative drive speeds of the rolls 88 and cam sectors 111 are selected so that the slack in the web assembly 15 accumulated between advances by the sectors 111 is used up each time the assembly 15 is intermittently advanced.

The intermittent feed mechanism 114 drives the web assembly 15 for a prescribed distance into a cutter mechanism 115. The cutter mechanism 115 has a rotary cutter 116 with a pair of knives that cooperate with the anvils on a backup roll 118 to transversely cut the web assembly 15 passing therebetween. The spacing between the knives on cutter 116 is such that the web assembly 15 is transversely cut at the right intervals for the insert 16 to have the correct height when the cutter 116 and cam sectors 111 are rotated in a timed relationship. The knives on the cutter 116 are nicked or mutilated so that the strips 12 and 13 are cut but the web 14 is almost completely across its width leaving some very narrow unsevered connecting strips. This allows the almost severed insert 16 to be pushed forwardly as the feed mechanism 114 advances the web assembly 15.

The advancing almost severed insert 16 passes between driven separator rolls 120 in the separator mechanism 121 that drivingly grip the insert 16. The rolls 120 continuously drive the insert 16 forwardly so that, when the intermittent advance of the web assembly 15 stops, the rolls 120 pull the insert 16 off of the web assembly 15 by breaking the narrow connecting strips. This separates the insert 16 from web assembly 15 and drives it onto the conveyor chains 122 that continue to advance insert 16.

Drive tabs on the conveyor chains 122 advance the separated insert 16 through a glue station 124. The glue station 124 has a narrow glue wheel 125 to apply an adhesive to that glue flap on insert 16 to be attached to the carrier blank first. As seen in FIGS. 3, 4, 9 and 10, the adhesive is applied to flap 28 and on that side opposite the strips 12 and 13. Sectors on a pressure plate 126 press the flap against the glue wheel 125 to insure adhesive application.

The conveyor chains 122 then pass the insert 16 under arcuate guides 128 to reverse the direction of movement of insert 16. As the insert 16 passes out from under guies 128, it passes under oppositely oriented guides 129 in the attachment mechanism 130. The attachment mechanism 130 has rotating sector plates 131 that keep the insert 16 against guides 129 and together with drive dogs 132 that engage the trailing end of insert 16 to drive it along guides 129.

At the same time, a carrier blank 18 is moved by conveyor chains 134 under the discharge end of guides 129 so that the insert 16 is laid on blank 18 at the desired location. One of the sector plates 131 is located over the flap which has the adhesive applied thereto so that the flap is pressed down onto the carrier blank 18 to be firmly bonded thereto.

Figure 9:
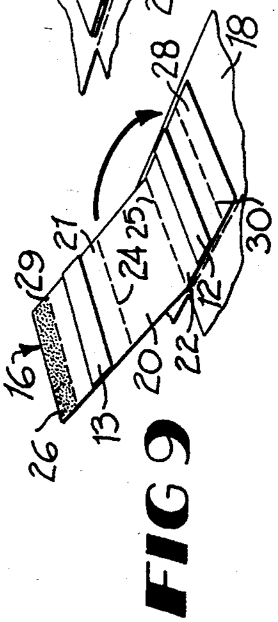
FIG. 9 is a perspective view illustrating the insert initially attached to the carrier blank side wall.
Figure 10:
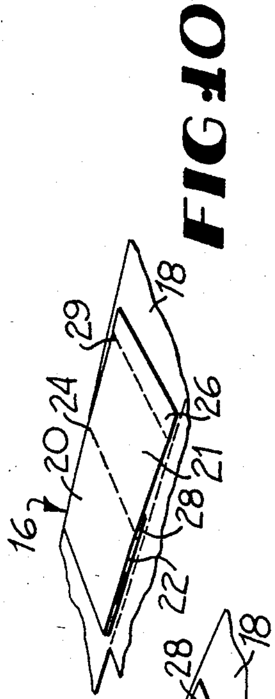
FIG. 10 is a perspective view illustrating the insert fully attached to the carrier blank side wall.

As the conveyor chains 134 move the carrier blank 18 with the insert 16 attached thereto by the glue flap 28 as seen in FIG. 9, adhesive is applied to the opposite glue flap 26 but on the same side of flap 26 as the strips 12 and 13 are located. The insert 16 is then folded back over itself along fold line 25 and the flap 26 pressed against the carrier blank 18 to bond flap 26 thereto as seen in FIG. 10.

The fabrication of the carrier blank 18 with the inserts 16 attached into the collapsed carrier 19 is completed on a right angle glue machine. Such fabrication is described in detail in U.S. Pat. Nos. 3,236,414 and 3,429,235 incorporated herein by reference. These fabrication steps are schematically illustrated in FIG. 1.

As seen in FIG. 2, the carrier 19 has opposed side walls 140 to each of which the glue flaps on one of the inserts 16 are attached; end walls 141 joining side walls 140; and a handle 142 connected to the end walls 141 by riser panels 144. The handle 142 has a downwardly projecting center panel 145 extending down between the medial panels 20 of the two inserts 16 and adhesively attached thereto to keep these panels 145 located in carrier 19. This forces the inserts 16 to form the center cells when the carrier 19 is set up. The bottoms of the cells are closed by a bottom wall.

What is claimed as invention is:

1. Apparatus for producing cell forming inserts for bottle carrier blanks from a continuous web of paperboard unwound from a roll comprising:

support means for supporting the roll of paperboard for free rotation about the axis of the roll;

a tensioning device receiving the web unwound from the roll and including a slide plate over which the web moves and at least one pressure roll for adjustably pressing the web against said slide plate so that a prescribed amount of force is required to pull the web through said tensioning device;

a slitter mechanism receiving the web from said tensioning device, said slitter mechanism including a backup roll over which the web passes, a drive shaft rotatably mounted for rotation about an axis normal to the longitudinal centerline of the web, a pair of spaced apart circular slitter knives mounted on said drive shaft for rotation therewith to engage the web and cut a continuous strip from opposite edges of the web, and a drive roll mounted on said shaft between said knives to engage the web moving over said backup roll so that said drive roll is rotated by the web moving thereby to rotate said slitting knives;

web guide means receiving the web from said slitter mechanism and including a shifting roll for shifting the web away from the strips cut therefrom;

strip guide means receiving the strips cut from the web, said strip guide means including a first pair of flanged rollers located in alignment with the strips so that each strip passes around one of said first rollers, a second pair of flanged rollers spaced from said first pair of rollers and located in alignment with the strips so that each strip passes around one of said second rollers, a pair of pivot arms pivoted between said first and second rollers, a flanged takeup roller rotatably mounted on each of said pivot arms so that one of said takeup rollers engages each of the strips between said first and second rollers and the weight of said pivot arm and takeup roller is exerted on the strip to keep the strip taut, a pair of strip deflectors engaging the strips after passage around said second rollers to shift the strips inboard of the edges of the web passing through said web guide means, and a pair of flanged positioning rollers spaced inboard of the edges of the web and located above the web around which the strips shifted by said strip deflectors pass to locate the strips a prescribed distance inboard of the edges thereof;

a second backup roll rotatably mounted below said flanged positioning rolls and over which the web from said web guide means passes;

a pair of spaced apart pressure rollers mounted adjacent said second backup roll in alignment with the strips from said positioning rolls and under which the strips pass to press the strips against the web at the prescribed distances inboard of the edges thereof;

a pair of glue applicators positioned between said positioning rollers and said pressure rollers to apply an adhesive to that side of the strips which will lie against the web so that the pressing of the strips against the web by said pressure rollers adhesively attaches the strips to the web; and a pair of driven rolls drivingly engaging the web with the strips adhesively attached thereto to pull the web and strips under tension from said tensioning device through said slitter mechanism, said web guide means, said strip guide means and between said second backup roll and said pressure rollers.

2. The apparatus of claim 1 further including perforating means for longitudinally perforating the web.

3. The apparatus of claim 1 further including severing means for transversely severing the web and the strip adhesively attached thereto to form the inserts.

4. The apparatus of claim 3 further including insert attachment means for adhesively attaching the inserts to the carrier blanks.

5. A method of forming cell forming inserts for bottle carrier blanks comprising the steps of:

pulling a continuous web of paperboard lengthwise of itself through a tensioning device to a prescribed tension in the web;

pulling the web with the prescribed tension therein through a slitter mechanism to slit continuous strips from opposite edges of the web;

moving the separated strips along one set of paths while maintaining the strips under the prescribed tension while simultaneously moving the remaining portion of the web under the prescribed tension along a separate path;

shifting the continuous strips laterally toward each other to reduce the lateral spacing therebetween to a distance less than the width of the web and moving the strips toward the web under the prescribed tension;

locating the continuous strips with respect to the continuous web so that the strips are located equidistant on opposite sides of the longitudinal centerline of the continuous web and laterally shifted inboard of the outside edges of the web a prescribed distance;

applying an adhesive to each of the strips while maintaining the strips under the prescribed tension;

pressing the strips under the prescribed tension against the continuous web also under the prescribed tension to reattach the strips to the continuous web the prescribed distance inboard of the edges thereof;

longitudinally perforating the web at spaced apart positions equidistantly located on opposite sides of the reattached strips;

transversely severing the web and strips attached thereto to form individual inserts; and attaching the inserts to the bottle carrier blank to form the center cells in the bottle carrier formed from the blank.

6. A method of producing cell forming inserts for bottle carrier blanks from a continuous web of paperboard unwound from a roll comprising the steps of:

supporting the roll of paperboard for free rotation about the axis of the roll;

passing the web unwound from the roll over a slide plate and under a pressure roll in a tensioning device where the roll adjustably presses the web against the slide plate so that a prescribed amount of force is required to pull the web through the tensioning device;

passing the web through a slitter mechanism by passing the web over a backup roll rotatable about an axis normal to the longitudinal centerline of the web and under a pair of rotating spaced apart circular slitter knives to cut continuous strips from opposite edges of the web;

passing the web from the slitter mechanism around a shifting roll to shift the web away from the strips cut therefrom;

passing each of the strips cut from the web around spaced apart flanged rollers and under a flanged takeup roller located between the first mentioned flanged rollers where the takeup roller exerts a force on the strips to keep the strip taut between the first mentioned flanged rollers;

then passing each of the strips through a deflector to shift the strips inboard of the edges of the web;

then passing each of the strips over a flanged positioning roller spaced inboard of the edges of the web and located above the web to locate each strip a prescribed distance inboard of the edge of the web;

passing the web over a freely rotatable second backup roller located below the strips;

passing each of the strips past a glue applicator to apply an adhesive to that side of the strips which will lie against the web;

then passing each strip under a pressure roll rotatably mounted adjacent the second backup roll so that the pressure roller presses the strip against the web at the prescribed distance inboard of the edge thereof to adhesively attach the strip to the web; and passing the web with the strips reattached thereto between a pair of driven rolls to drivingly engage the web and strips to pull the web and strips under tension through the above steps.

* * * * *